United States Patent [19]

Achelpohl et al.

[11] Patent Number: 4,459,172

[45] Date of Patent: Jul. 10, 1984

[54] APPARATUS FOR STACKING FLAT ARTICLES

[75] Inventors: Fritz Achelpohl; Wolfgang Rosocha, both of Lengerich of Westphalia, Fed. Rep. of Germany

[73] Assignee: Windmöller & Hölscher, Lengerich, Fed. Rep. of Germany

[21] Appl. No.: 353,350

[22] Filed: Mar. 1, 1982

[30] Foreign Application Priority Data

Mar. 2, 1981 [DE] Fed. Rep. of Germany ....... 3107883

[51] Int. Cl.[3] ....................... B65H 29/32; B26D 7/06; B65G 57/04; B32B 31/00

[52] U.S. Cl. .................................. 156/515; 271/195; 271/196; 271/314; 83/98; 83/169; 83/402; 493/204; 414/72

[58] Field of Search ............................... 271/195-197, 271/314, 272-274; 83/98, 169, 99, 402; 226/95; 406/88, 52; 414/72; 493/204; 156/515

[56] References Cited

U.S. PATENT DOCUMENTS

| | | | |
|---|---|---|---|
| 2,769,495 | 11/1956 | Pomper et al. | 271/195 X |
| 3,243,181 | 3/1966 | Lyman | 271/195 X |
| 3,685,632 | 8/1972 | Brady | 406/88 |
| 4,062,538 | 12/1977 | Stange et al. | 271/195 X |
| 4,286,907 | 9/1981 | Houle et al. | 271/196 X |

FOREIGN PATENT DOCUMENTS 2332925 1/1974 Fed. Rep. of Germany .

OTHER PUBLICATIONS

M. Gagne et al., "Device Air Transport System", *IBM Disclosure Bulletin,* vol. 21, No. 1, Jun. 1978, pp. 84-85.

*Primary Examiner*—Bruce H. Stoner, Jr.
*Assistant Examiner*—Lisa M. Rosenberg
*Attorney, Agent, or Firm*—Fleit, Jacobson, Cohn & Price

[57] ABSTRACT

The invention relates to stacking flat articles, such as tube sections, bags or sacks, with two spaced apart hubs arranged to rotate in synchronism on a horizontal axis and carrying respective spiders, the arms of which are equally angularly spaced and on their leading sides, in the sense of rotation, carry suction nozzles, with a receiving or carrying conveyor for the article disposed between the arms adjacent to the horizontal plane which contains the horizontal axis and protrude beyond the articles to such an extent that the side edges of the articles extend, at least in part, to the planes in which the arms are rotatable. A series of needles are disposed on the side of the axis which is opposite to the receiving conveyor and are closely spaced from the arms of one of the spiders and extend approximately parallel to that one of the arms which is in a vertical position, to enter perforations of the articles as the articles are delivered by the arms. The receiving conveyor is preceded by a pair of pinch rollers, which are formed with spaced apart annular grooves and air blast nozzles are provided in the annular grooves on both side of a sheeting web, with additional air blast nozzles arranged in a row extending in the direction of conveyance and disposed laterally between the receiving conveyor and the planes in which the arms are rotatable.

10 Claims, 3 Drawing Figures

APPARATUS FOR STACKING FLAT ARTICLES

Figure 1:
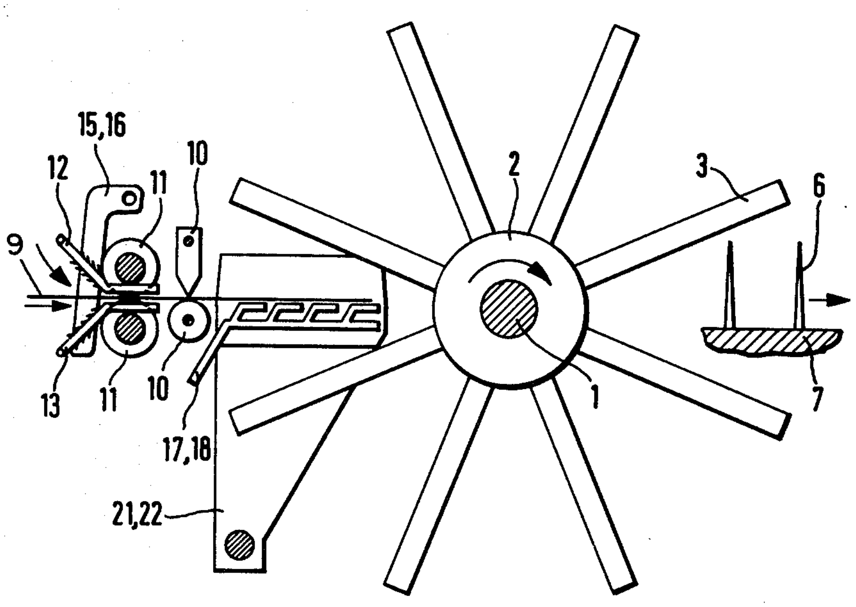

This invention relates to apparatus for stacking flat articles, such as tube sections, bags or sacks, comprising two spaced apart hubs arranged to rotate in synchronism on a horizontal axis and carrying respective spiders, the arms of which are equally angularly spaced and on their leading sides in the sense of rotation carry suction nozzles, further comprising receiving or carrying means for the articles, which receiving or carrying means are disposed between the arms adjacent to the horizontal plane which contains the horizontal axis and protrude beyond the articles to such an extent that the side edges of the articles extend at least in part the planes in which the arms are rotatable, further comprising a series of needles, which are disposed on that side of the axis which is opposite to the receiving means and are closely spaced from the arms of one of said spiders and extend approximately parallel to that one of said arms which is in a horizontal position and are adapted to enter perforations of the articles as the latter are delivered by said arms, and means for sucking air from said nozzles and for controlling the air thus sucked.

In delivering means of that kind which are known from German Opened Application No. 23 32 925, the individual workpieces which have been severed from a continuous tubing are supplied to a transfer rake, which lifts each workpiece from one of the arms rotating in synchronism and rotates the workpieces through 180° and then pins them onto a needle-carrying chain. It has been found that when such an apparatus operates at a high cycle frequency it is no longer possible to place each workpiece smoothly and with straight edges onto the transfer rake so that the rotating arms can no longer receive the individual workpieces exactly in the desired position. As a result, the punched holes formed in the workpieces near the edges thereof cannot be pinned exactly in the desired position onto the needles carried by the chain.

It is an object of the invention to provide an apparatus which is of the kind described first hereinbefore and is adapted to receive articles supplied at a high rate and to pin said articles on needles so that the workpieces can be stacked.

This object is accomplished according to the invention in that the receiving means are preceded by a pair of pinch rollers, which are formed with spaced apart annular grooves, air blast nozzles are provided in said annular grooves on both sides of the sheeting web, which is fed by the pinch rollers, transverse severing means are provided between the pair of pinch rollers and the receiving means, and additional air blast nozzles are arranged in a row extending in the direction of conveyance and disposed laterally between the receiving means and the planes in which the arms are rotatable, which additional air blast nozzles include an acute angle with the direction of conveyance. As the web is intermittently advanced by the pair of pinch rollers, the air blast causes the leading end of said web to be held in a taut condition over the receiving means and the oblique air blast nozzles ensure that the side portions of the end of the continuous web will be taut too so that the sheeting section which has been severed will be correctly positioned as it is received by the arms and as it is pinned by the arms onto the row of needles. The movement of the arms which entrain the sheeting section through the plane of conveyance is so timed in relation to the severing of the sheeting section from the web that the sheeting section cannot move freely in the air blast.

In a preferred embodiment, air-guiding vanes are disposed approximately on the level of the arms on that side of the plane of rotation of the arms which is opposite to the oblique air blast nozzles. It has surprisingly been found that the side edges of the sheeting sections will be held taut even if the air-guiding vanes consist of sheet metal elements which are parallel to the planes in which the arms are rotatable.

The transverse severing device consists preferably of a hot wire welding device, which can be used, e.g., to make bags from a two-ply web which is open on one side.

Further desirable features within the scope of the invention are described in the dependent claims.

Figure 2:
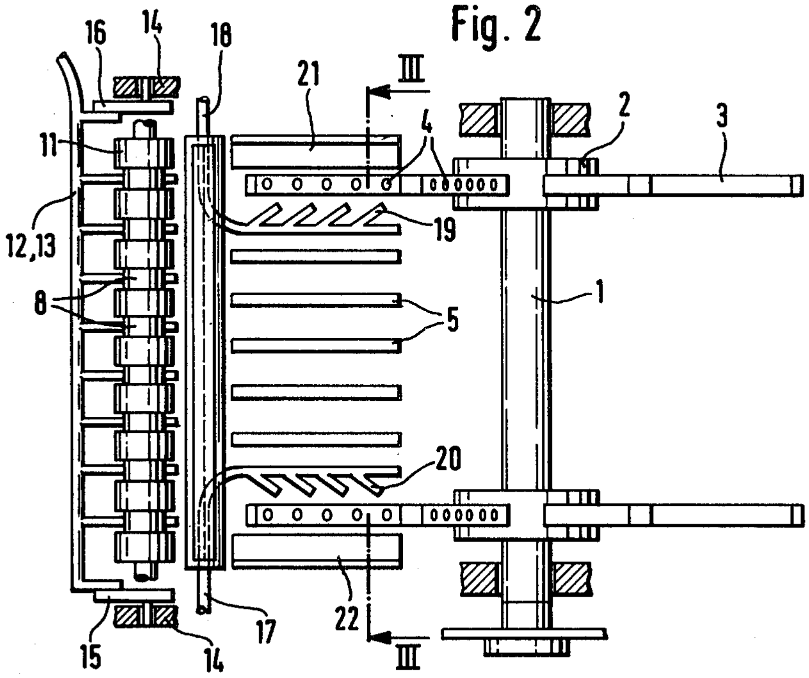
Figure 3:
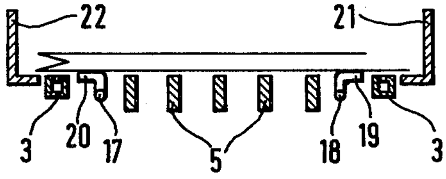

An illustrative embodiment of the invention will now be described more in detail with reference to the accompanying drawing, in which FIG. 1 is a diagrammatic side elevation showing the receiving and stacking apparatus, FIG. 2 is a top plan view showing the apparatus of FIG. 1 and FIG. 3 is a sectional view taken on line III—III in FIG. 2.

A shaft 1 is mounted in the machine frame and carries hubs, which carry radial arms having a uniform angular spacing so that there are two spiders 2, which are spaced apart. Each arms 3 of said spiders 2 is provided with suction openings 4, which communicate with a vacuum pump. The vacuum is so controlled that the vacuum is instantaneously applied to the two cooperating spider arms 3 when they are below the delivery rake 5. As a result, the workpiece disposed on the delivery rake 5 is sucked and as the spiders 2 rotate in the clockwise sense is retained until the workpiece has been pinned onto a conveyor chain 7, which has upstanding needles 6. The needle-carrying conveyor chain 7 is disposed beside one of the spiders 2 so that the workpieces will depend and cannot obstruct the movement of the spider arms.

Each workpiece is severed from a continuous web 9 by a welding device 10. The web 9 is pulled forward by pinch rollers 11, which are formed with a plurality of annular grooves 8. Two air-blowing rakes 12 and 13 are guided in the annular grooves of the upper and lower pinch rollers, respectively, and are secured to respective arms 15 and 16, which are pivoted to the machine frame 14. By the air stream which is blown from the air-blowing rakes 12 and 13 in the direction of conveyance, the web portion pulled by the pinch rollers 11 is transferred to the delivery rake 5 when the welding device 10 has been opened.

To ensure a satisfactory and smooth delivery of each pulled web portion onto the rake 5 even at a high cycle frequency, blast tubes 17 and 18 are provided on both sides of the rake 5 and carry forwardly and outwardly directed, oblique nozzles 19 and 20. The air which is blown from said nozzles stretches each advanced web portion forwardly and laterally to a ensure that the web portion will be placed onto the rake 5 smoothly and with straight edges. In this connection it has been particularly desirable to provide air-guiding vanes 21 and 22, which are associated with the nozzles 19 and 20 and guide the air stream.

What is claimed is:

1. Apparatus for stacking flat articles, such as tube suctions, bags or sacks, said apparatus comprising:
two hubs spaced apart from each other, said hubs rotating in synchronism on a common horizontal axis;
two spiders carried by said hubs;
arms of said spiders equally angularly spaced;
suction nozzles on said arms, said suction nozzles on a leading side of said arms, said leading side determined by the direction of rotation of said arms;
carrying means for the articles disposed between said arms, said carrying means being adjacent to a horizontal plane extending through said horizontal axis, said carrying means protrude beyond the side edges of the articles and the side edges of the articles extend at least in part in a plane of rotation of said arms;
a series of needles disposed in said horizontal plane extending through said horizontal axis, said needles disposed on the opposite side of said hubs relative to said carrying means, said needles being closely spaced from the arms of one of said spiders, said needles extending substantially parallel to one of said arms disposed in a vertical position and said needles adapted to enter perforations to the articles as the articles are delivered to said needles by said arms;
means for sucking air from said suction nozzles and for controlling the air thus sucked;
a pair of pinch rollers having spaced apart annular grooves, said rollers disposed on the opposite side of said receiving means relative to said hubs and said rollers feeding a continuous web to said receiving means;
air blast nozzles provided in said annular grooves, said air blast nozzles directed towards said web;
severing means transverse to said web, said severing means provided between said rollers and said receiving means; and
additional air blast nozzles arranged in a row, said additional air blast nozzles extending outwardly and in the direction of conveyance of said web, said additional nozzles forming an acute angle with the direction of conveyance and said additional nozzles disposed laterally between said carrying means and the planes of rotation of said arms.

2. Apparatus according to claim 1, characterized in that air-guiding vanes are disposed approximately on the level of the arms on that side of the plane of rotation of the arms which is opposite to the oblique air blast nozzles.

3. Apparatus according to claim 2, characterized in that the air-guiding vanes consist of sheet metal elements which are parallel to the plane in which the arms are rotatable.

4. Apparatus according to claim 3, characterized in that the transverse severing device consists of a hot wire welding device.

5. Apparatus according to claim 4, characterized in that the hubs are mounted on a common shaft which has an axial air-sucking passage.

6. Apparatus according to claim 5, characterized in that the air blast nozzles include an angle of about 45° with the direction of conveyance.

7. Apparatus according to claim 6, characterized in that the air blast nozzles are closely spaced below the plane of conveyance.

8. Apparatus according to claim 7, characterized in that the air blast nozzles are disposed on opposite sides of the plane of conveyance of the web.

9. Apparatus according to claim 3, characterized in that the air-guiding vanes have a lower leg which is angled inwardly.

10. Apparatus according to claim 9, characterized in that the carrying means consist of a grate having bars which are parallel to the direction of conveyance.

* * * * *